United States Patent [19]

Malkamaki et al.

[11] Patent Number: 5,491,832
[45] Date of Patent: Feb. 13, 1996

[54] CELLULAR RADIO COMMUNICATIONS SYSTEM

[75] Inventors: Esa Malkamaki, Espoo; Harri Jokinen, Hiisi, both of Finland

[73] Assignee: Nokia Mobile Phones Ltd., Salo, Finland

[21] Appl. No.: 336,018

[22] Filed: Nov. 8, 1994

Related U.S. Application Data

[63] Continuation of Ser. No. 946,529, Sep. 16, 1992, abandoned.

[30] Foreign Application Priority Data

Sep. 17, 1991 [FI] Finland ................................. 914369

[51] Int. Cl.[6] ......................... H04B 1/04; H03C 5/00
[52] U.S. Cl. ................ 455/33.1; 375/298; 375/308; 332/100; 332/103; 332/119; 332/151
[58] Field of Search ................. 455/33.1, 33.4, 455/54.1, 56.1; 379/59; 332/100–105, 119, 151, 127–128; 375/298, 308

[56] References Cited

U.S. PATENT DOCUMENTS

| | | | |
|---|---|---|---|
| 4,955,083 | 9/1990 | Phillips et al. | 455/47 |
| 5,124,672 | 6/1992 | Kuisma | 332/119 |

FOREIGN PATENT DOCUMENTS

| | | |
|---|---|---|
| 0328836A3 | 8/1989 | European Pat. Off. |
| 632362A5 | 9/1982 | Switzerland . |
| WOA9113502 | 5/1991 | WIPO . |

OTHER PUBLICATIONS

Chia, S. T. S, "Flexible System Techniques for Future Personal Mobile Communication Systems", *IEEE Region 10 Conference on Computer and Communication Systems*, Sep. 1990, Hong Kong.

Chia, S. T. S., "A Handover Protocol For a Mixed Cell System", Sixth International Conference on Mobile Radio and Personal Communications, Dec. 9–11, 1991, IEE, pp. 225–232.

*Primary Examiner*—Andrew I. Faile
*Attorney, Agent, or Firm*—Perman & Green

[57] ABSTRACT

A modulation apparatus for a cellular radio system in which capacity is increased and power consumption is minimized, said system covering large and small area cells of different sizes. At least two different modulation schemes are used in the system. For large area cells, constant envelope modulation is used for minimizing power consumption, and for small area cells, linear modulation is used for minimizing the channel spacing, and in this manner, for increasing the cellular capacity.

2 Claims, 1 Drawing Sheet

CELLULAR RADIO COMMUNICATIONS SYSTEM

"This is a continuation of application Ser. No. 07/946,529 filed on Sep. 16, 1992 now abandoned.

The present invention relates to a cellular radio communications system, said system comprising cells of different sizes.

BACKGROUND OF THE INVENTION

The current digital cellular systems, such as GSM in Europe and DAMPS in the USA, are mainly based on large cells. The visions for mobile communications include a low-cost pocket telephone for free communication at home, in offices, city centres or suburbs, and in the countryside. For the services of the mobile telephone network to be functional in a wide area, large cells should be used in rural and suburban areas, and small cells in city centres and inside buildings in order to provide a sufficient capacity in areas in which the traffic demand is high. The service requirements are different in different environments. Speech transfer will be the most important service in most environments, but demand for data transfer service will be increasing, particularly for indoor communication.

As regards the modulation schemes, the system requirements vary in different environments. For instance, the conditions for signal propagation are different indoors and outdoors, as well as in small cells in which the aerials are located low and in large cells in which the aerials are high. In addition, the communication range varies from a couple of meters to tens of kilometers. In large cells the range is mainly limited by the peak power of the transmission which indicates that power amplifiers with higher efficiencies are needed. For this reason, constant envelope modulation schemes have traditionally been used in mobile communications because they allow the use of non-linear amplifiers which have a higher power efficiency than the linear amplifiers. A higher spectrum efficiency is achieved with the linear modulation schemes than with the constant envelope modulation schemes because the bandwidth efficiency of the linear modulation schemes is higher. The bandwidth efficiency refers to the bit rate of the channel divided by the channel bandwidth. The linear modulation schemes, however, require linear or linearized power amplifiers which in general are less power efficient than the non-linear amplifiers. Consequently, the linear modulation schemes are not optimal for large cells, and therefore, the constant envelope modulation schemes have traditionally been used in mobile telephone networks.

In small cells the output power levels are quite low, and the power consumption of a power amplifier is only a fraction of the total power consumption. For this reason, the use of linear modulation schemes is feasible in small cells, and would even be most desirable, because they offer higher capacity than the constant envelope modulation schemes.

U.S. Pat. No. 4,955,083 discloses a prior art method of cellular radio telephone communications wherein one modulation system is used in providing a signal and another modulations system is used for the transmission of actual information (i.e. speech).

Swiss patent CH632,362 discloses a cellular radio telephone communication system in which frequency and/or phase modulation is used. However, frequency and phase modulation cannot be considered as two different modulation systems as they are merely alternative ways of presenting the same modulation.

European patent EP 328836 discloses a cellular radio telephone communications system in which different modulation schemes are used in different directions i.e. to and from the mobile receiver.

SUMMARY OF THE INVENTION

According to a first aspect of the present invention there is provided a cellular radio communications system comprising cells of at least two sizes, characterized in that linear signal modulation is used in smaller cells and non-linear signal modulation is used in larger cells According to a second aspect of the present invention there is provided a method of cellular radio communication, for use in networks including cells of at least two sizes, wherein, a first modulated communications signal is produced by linear modulation for smaller cells, and a second modulated signal is produced by non-linear modulation for larger cells.

In cells of different sizes different modulation schemes are used so that a non-linear constant envelope modulation scheme is used in large cells, and a linear modulation scheme in small cells. The spectrum of linear modulation schemes is narrow and the cell capacity can be increased in that manner. Different schemes are optimal for different cells, because the power consumption of the constant envelope modulation scheme is lower, whereby it is advantageous for use in large cells, and with the linear modulation scheme a higher capacity is achieved, so it is advantageous for use in small cells in which a higher capacity is needed, and the power consumption of the power amplifiers is not a major problem. In small cells, i.e., in microcells, the adjacent channel attenuation requirements are higher than in large cells. Since a higher adjacent channel attenuation and consequently a lower adjacent channel interference are achieved with the linear modulation scheme, it is advantageous to use said scheme in microcells.

The constant envelope modulation method could be e.g. a differential encoded GSMK scheme (Gaussian Minimum Shift Keying), in which the bandwidth (BT product) normalized for the bit rate has been so selected that linear approximation is possible and a linear quadrature receiver can therefore be implemented. For the linear modulation scheme, for instance a binary offset QAM scheme (Quadrature Amplitude Modulation) can be used. Binary Offset QAM may in general be expressed as:

$$s(t) = \left[ \sum_k a_{2k} h(t - 2kT) \right] \cos(2\pi f_c t) - \left[ \sum_k a_{2k-1} h(t - (2k-1)T) \right] \sin(2\pi f_c t)$$

where $f_c$ is the carrier frequency, $1/T$ is the data rate (bit rate), and $a_k$ is the kth data bit taking values of $+1$ or $-1$, representing the original binary data or a suitably coded version of it. Large variety of schemes can be generated by using different pulse shaping $h(t)$, e.g. a raised cosine spectral shaping. For MSK modulation the shaping waveform is a half-cycle sinusoidal pulse of duration $2T$ and alternating sign. GMSK can also be approximated by this formula $s(t)$ by using an appropriate pulse shaping $h(t)$. The shaping reference number 1 in FIG. 1, which is explained later in this text, could also be a filter having square root raised cosine spectrum with impulse response given by:

$$h(t) = \sqrt{\frac{E_g}{2T}} \frac{1}{\pi t/2T} \left( \sin\pi \frac{(1-\alpha)t/2T + 4\alpha t/2T \cos\pi(1+\alpha)t/2T}{1-(4\alpha t/2T)^2} \right)$$

which is uniquely defined by the roll-off factor $\alpha=0 \ldots 1$. $E_g$ is the energy of the pulse h(t) (and is usually normalized to equal 1).

In order to make the modulation scheme fully compatible with differential encoded GMSK (as in GSM) the data bits $a_{2k}$ and $a_{2kd-1}$ have to be multiplied by $(-1)^k$ thus having alternate signs in both in-phase and quadrature components of the signal.

The use of the linear modulation scheme in small cells would make an increase of the bit rate possible without changing the bandwidth. This is possible by using a linear multilevel modulation scheme. For instance, the GMSK scheme could be used in large cells, and the binary Offset QAM scheme in the microcells. In microcells the quaternary Offset QAM scheme could be used in the data part of the time slot of the TDMA (Time Division Multiple Access) frame, and thus the bit rate could be doubled in small cells. In the tail parts of the burst and in the training sequence, the binary Offset QAM scheme would be used in order that these remain readable to all users. In this manner, the use of a linear modulation scheme enables an increase in the bit rate.

In the future, as the service requirements increase, a higher bit rate is required for certain services, such as videophones. A solution for this purpose could be GSM in large cells and a scaled version of GSM in small cells, in which the bit rate could be is e.g. six times that of GSM. The bit rate would then be 6*270.833 kbit/s, or 1.625 Mbit/s. The channel spacing would also be upscaled, so that it would be 6*200 kHz, or 1.2 MHz. The channel spacing might have to be increased even to e.g. 1.4 MHz. The problem in implementing this is that from the 13 MHz clock frequency of the GSM such frequencies as 1.2 and 1.4 MHz cannot be generated. A solution to this problem would be the use of a channel spacing which can be generated from the 13 MHz clock, for instance 1 MHz or 1.182 MHz. The GMSK scheme would not allow this kind of channel spacing narrowing because of adjacent channel interference. The use of the linear modulation scheme according to the invention in the microcells would enable narrowing of the channel spacing into 1 MHz without increasing adjacent channel interferences, and in this manner the bit rate could be six times higher in the small cells.

A modulator needed for different modulation schemes can be implemented using a quadrature modulator structure implemented either with FIR filters or by using a look-up table. Various modulation schemes can be generated using this modulator by changing, depending on the implementation, either a filter or a look-up table stored e.g. in a ROM.

BRIEF DESCRIPTION OF THE DRAWINGS

Embodiments of the present invention will now be described, by way of example, with reference to the accompanying drawings, in which.

DETAILED DESCRIPTION OF THE INVENTION

Figure 1:
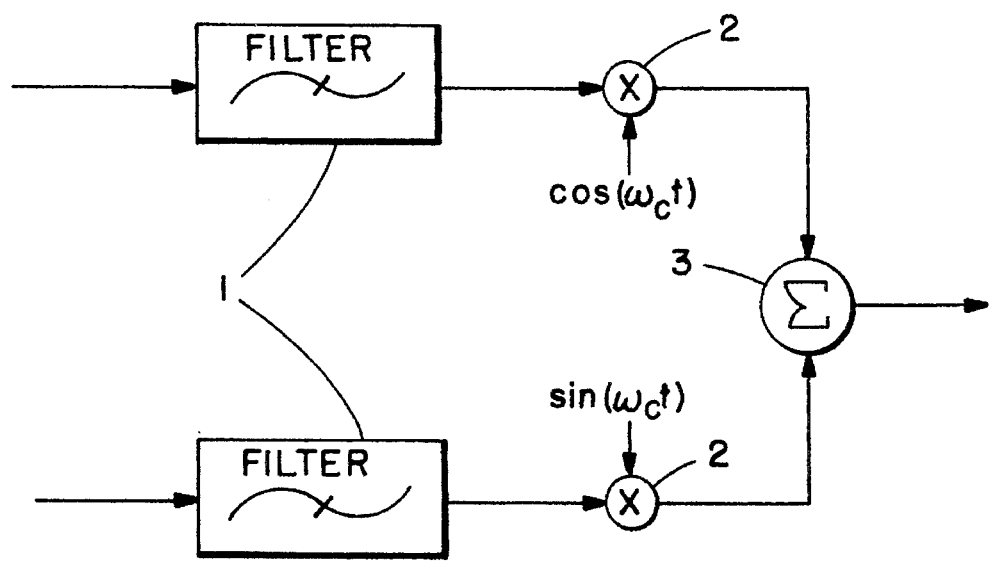
FIG. 1 presents an example of the implementation of a quadrature modulator with filters.

FIG. 1 presents a principled implementation of a quadrature modulator with filters 1 which can be e.g. FIR filters.

The encoded signals are passed through the filters 1, the output signals are multiplied with selected multipliers in multipliers 2, from which the signals are carried to an adder 3 for forming the final output signal of the modulator. The modulator can be used for implementing different modulation schemes by replacing the filters 1 with other filters, in which the impulse response has been selected for the desired modulation scheme.

Figure 2:
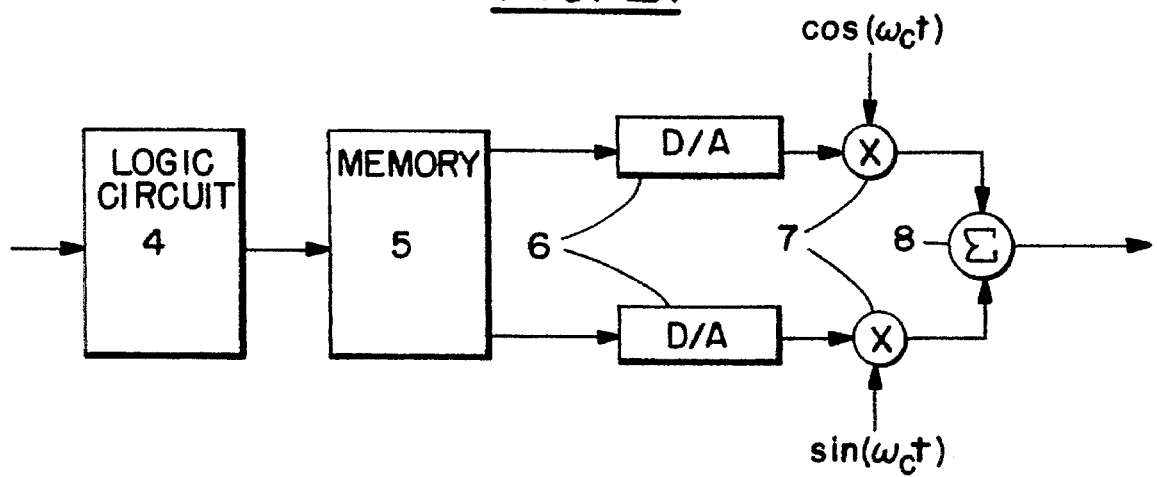
FIG. 2 presents an example of a look-up table implementation of the quadrature modulator.

FIG. 2 shows an example of a look-up table implementation of a quadrature modulator, in which data is received in digital form in an addressing logic circuit 4, from which it is taken to a memory 5, preferably ROM, which includes a look-up table implementing the modulation scheme, said table comprising in digital form the waveforms to be output. From the ROM 5 the signal is divided into two branches and carried to D/A converters 6, the analog signals produced in which are multiplied with appropriate coefficients in multipliers 7 and finally, the responses of the parallel branches are summed in an adder 8 for forming the output signal for the modulator. The D/A converters 6 need not be included in the modulator, as is the case in FIG. 1; instead, the signal can for transmission be converted to an analog signal with a D/A converter (not shown) positioned between the modulator and the transmitter. The modulator shown in FIG. 2 can be used for implementing different modulation schemes by changing the look-up table in the ROM 5.

An advantage of the present invention is that in a cellular radio system a higher capacity is achieved without major problems in power consumption. When linear modulation is employed the power consumption somewhat increases in the small cells, in which power consumption is not a limiting factor, and in large cells in which the capacity is not a limiting factor, a constant envelope modulation scheme is used and the power consumption can be maintained lower. An increase in the capacity in the small cells is achieved by the use of a linear modulation scheme, with which a narrower channel spacing is provided in comparison with other schemes. In the constant envelope modulation scheme, a narrowing in the channel spacing is not feasible to the same extent as in the linear modulation schemes because adjacent channel interference would become too great. In the linear modulation schemes the adjacent channel interference remains small because the linear modulation schemes have a narrow spectrum, the implementation of which is possible since envelope variation is allowed. Thus, not only a higher capacity can be achieved with the linear modulation scheme, but also adjacent channel interference decreases. Moreover, the bit rates may be increased in the small cells by using a linear modulation scheme.

A linear modulation scheme can be used both in a base station and in a mobile station, or merely in one of them. Statistically, adjacent channel interference is more general in transmissions from a base station to a mobile station than vice versa. Therefore, it is advantageous to use a linear modulation scheme in the small cells, at least in the base stations. The mobile station need not be indicated of which of the modulation schemes the base station is using in a transmission because in a mobile station, one and the same receiver can be used for receiving a signal modulated with a linear modulation scheme as well as with a constant envelope modulation scheme.

We claim:

1. A quadrature modulator circuit for cellular radio communications systems for use in both large and small area cell regions comprising:

a first filter circuit having an input and an output and responsive to an encoded signal applied to said input thereof for providing a first filtered encoded output signal;

a second filter circuit having an input and an output and responsive to an encoded signal applied to said input thereof for providing a second filtered encoded output signal, a first multiplier circuit having a first input connected to the output of said first filter circuit and responsive to a cos ($w_c t$) modulating signal for selectively modulating the first filtered encoded output signal from said first filter circuit to selectively provide a cosine component of a binary offset quadrature amplitude first linear modulated signal for use exclusively in small cell areas and a cosine component of a non-linear constant envelope differential encoded GMSK modulated signal for use exclusively in large cell areas, a second multiplier circuit connected to the output of said second filter circuit and responsive to a sin($w_c t$) modulating signal for selectively modulating the second filtered encoded output signal from said second filter circuit to provide a sine component of said non-linear constant envelope differentially encoded GMSK modulated signal for use exclusively in large cell areas and a sine component of said binary offset first linear modulated signal for use exclusively in small cell areas, and an adder circuit connected to said first and second multiplier circuits for adding said cosine and sine component signals from said multiplier circuits for selectively providing an output signal consisting of said linear modulated output signal exclusively for small cell areas and of said non-linear modulated signal exclusively for large cell areas.

2. A quadrature modulator circuit for a cellular radio communications system as claimed in claim 1, wherein said quadrature modulator circuit includes a lookup table memory means having stored therein first and second sets of waveform signals in digital form for providing said cos($w_c t$) modulating signal and for providing said sin($w_c t$) modulating signal to said first and second multiplier circuits respectively according to the desired signal modulation scheme of said quadrature modulator circuit.

* * * * *